United States Patent [19]
Lee et al.

[11] Patent Number: 5,629,743
[45] Date of Patent: May 13, 1997

[54] VIDEO SIGNAL PROCESSOR FOR TWO-PANEL LIQUID CRYSTAL PROJECTOR

[75] Inventors: Myeong-hwan Lee; Han-il Ko; Dong-il Song, all of Suwon, Rep. of Korea

[73] Assignee: Samsung Electronics Co., Ltd., Kyungki-do, Rep. of Korea

[21] Appl. No.: 418,625

[22] Filed: Apr. 7, 1995

[30] Foreign Application Priority Data

Apr. 7, 1994 [KR] Rep. of Korea .............. 94-7248

[51] Int. Cl.$^6$ .................. H04N 5/74; H04N 9/67
[52] U.S. Cl. ....................... 348/751; 348/659
[58] Field of Search ..................... 348/751, 756, 348/757, 759, 760, 761, 766, 659–661, 663, 664, 675, 676, 679, 692, 712, 713, 673, 678, 687, 688; H04N 5/74, 9/31, 9/67

[56] References Cited

U.S. PATENT DOCUMENTS

| | | | |
|---|---|---|---|
| 4,568,967 | 2/1986 | Freyberger et al. | 348/660 |
| 4,661,841 | 4/1987 | Suzuki | 348/660 |
| 4,677,462 | 6/1987 | Bell | 348/663 |
| 5,325,182 | 6/1994 | Murata et al. | 348/675 |

FOREIGN PATENT DOCUMENTS

| | | | |
|---|---|---|---|
| 4267246 | 2/1993 | Japan | H04N 5/74 |

Primary Examiner—Michael Lee
Attorney, Agent, or Firm—Sughrue, Mion, Zinn, Macpeak & Seas

[57] ABSTRACT

A video signal processing apparatus for use in a two-panel liquid crystal projector includes a matrix circuit which receives a luminance signal and color signals and generates a new luminance signal by adding the minimum value of the color difference signals to the luminance signal. The minimum value is subtracted from the respective color difference signals to generate new color signals. Another matrix circuit generates color signals and a luminance signal which are applied to a liquid crystal panel based on the minimum value of the color signals which are obtained by the existing matrix circuit instead of using the color difference signals. The color signals and luminance signal which are obtained by the respective matrix circuits are used for light modulation for a color liquid crystal panel and a white/black liquid crystal panel. The amplitude of the newly obtained luminance signal is amplified based on the difference between light utilization efficiencies of the luminance signal and the color signals which are displayed on a screen. Thus, an unnatural image phenomenon is removed and resolution and brightness can be improved. Further, dis-harmonization between the luminance signal component and the color signal component can be prevented in view of the optical and signal processing conditions.

8 Claims, 6 Drawing Sheets

VIDEO SIGNAL PROCESSOR FOR TWO-PANEL LIQUID CRYSTAL PROJECTOR

BACKGROUND OF THE INVENTION

1. Field of the Invention

The present invention relates to a liquid crystal projector using a liquid crystal panel, and particularly to a video signal processing apparatus for a liquid crystal projector in which a video signal applied to a liquid crystal panel is controlled so as to improve the brightness and resolution of a displayed image.

2. Description of Related Art

Generally, a liquid crystal projector uses a liquid crystal panel in which light modulation is controlled according to an applied voltage to display an image on a screen. The liquid crystal projector uses a one-panel system, a two-panel system or a three-panel system.

Referring to FIGS. 1 through 3, conventional liquid crystal projectors adopting the one-panel, two-panel and three-panel systems will be described below. In FIGS. 1 through 3, values in the parentheses of the respective reference numerals represent light transmission factors in corresponding components. The light transmission factors correspond to those of commercial components which are currently available.

FIG. 1 shows a conventional one-panel liquid crystal projector. When the light from a lamp 11 passes through a hot mirror 12, light excluding a visible ray is intercepted. The visible ray is collected by a focus lens 13 and then the collected visible ray is incident to a polarizing filter 14. Only forty percent of the incident light passes through polarizing filter 14 and is incident to a liquid crystal panel 15 for R, G and B primary color signals. Only ten percent of the incident light of liquid crystal panel 15 passes therethrough and then is incident to polarizing filter 16. Ninety percent of the light incident to polarizing filter 16 passes therethrough and then is projected on a screen via a projection lens 17. As described above, since the one-panel liquid crystal projector has a small number of components, a compact, low-price and easily assembled product may be manufactured. However, since a color signal liquid crystal panel composed of a combination of R, G and B subpixels has been used, an efficiency of light utilization is reduced to 3.06%, resulting in low image brightness.

FIG. 2 shows an optical arrangement of a conventional three-panel liquid crystal projector. The three-panel liquid crystal projector uses three liquid crystal panels for R, G and B color signals, respectively. When the light from a lamp 21 passes through a hot mirror 22, light excluding a visible ray is intercepted. The visible ray is incident to a dichroic mirror 23. The dichroic mirror 23 separates color components of the incident light. The R component reflected from dichroic mirror 23 passes through a mirror 24 and a polarizing filter 25 and is incident to a liquid crystal panel 26 for an R signal. The G and B components transmitted through dichroic mirror 23 are incident to another dichroic mirror 27. The B component reflected from dichroic mirror 27 passes through a polarizing filter 28 and is incident to a liquid crystal panel 29 for a B signal. The G component transmitted through dichroic mirror 27 passes through a polarizing filter 30 and is incident to a liquid crystal panel 31 for a G signal. The light passing through R signal liquid crystal panel 26 and the light passing through B signal liquid crystal panel 29 are incident to dichroic mirror 34 via polarizing filters 32 and 33, respectively. The dichroic mirror 34 transmits the R component of the incident light and reflects the B component thereof, to transfer the incident components to dichroic mirror 35. The light passing through G signal liquid crystal panel 31 passes through polarizing filter 36 and then is reflected from mirror 37. The light reflected from mirror 37 is incident to dichroic mirror 35. The dichroic mirror 35 for combining the colors transmits the R and B components and reflects the G component, so as to be supplied to a projection lens 38. The projection lens 38 projects the incident light on a screen. As described above, since the three-panel liquid crystal projector uses a liquid crystal panel for each color component, the picture quality is higher and the total efficiency of light utilization of 4.23% is higher than those of the one-panel system. Thus, the brightness of the image is slightly increased. However, due to the higher number of components, the structure is complicated. Also, use of the three liquid crystal panels results in increased costs.

A two-panel liquid crystal projector has been developed to solve the drawbacks of the above-described one-panel and three-panel systems. A conventional two-panel liquid crystal projector is shown in FIG. 3. The two-panel liquid crystal projector uses two liquid crystal panels for a luminance signal and a color signal. In FIG. 3, when the light from lamp 41 passes through hot mirror 42, the light excluding a visible ray is intercepted. The visible ray is divided into an S polarized component and a P polarized component by polarizing filter 43. The S polarized component reflected from polarizing filter 43 is reflected again by mirror 44 and is input to a white/black liquid crystal panel 45. The P polarized component transmitted from polarizing filter 43 is reflected by mirror 46 and is input to a color liquid crystal panel 47. The S polarized component is optically modulated as a white and black image by white/black liquid crystal panel 45 and is incident to polarizing filter 48. The P polarized component is optically modulated as a color image by color liquid crystal panel 47 and is incident to polarizing filter 48. The polarizing filter 48 for combining both polarized components transmits the input white and black image and reflects the color image, so as to be supplied to a projection lens 49. The projection lens 49 supplies the white/black image and the color image to a screen, so as to be overlapped and displayed thereon.

The structure of the white/black liquid crystal panel which is used in the two-panel liquid crystal projector is shown in FIG. 4 and that of the color liquid crystal panel is shown in FIG. 5. The pixel structure of the conventional liquid crystal panel has a delta-type pixel array (a triangular structure) in which an even column and an odd column are offset by half of a pixel. The pixel structure of the white/black liquid crystal panel is a field quincunx (QT) structure in space in view of a sampling operation, having a resolution area such as a frequency spectrum shown in FIG. 6. In the pixel structure of the color liquid crystal panel as shown in FIG. 5, the respective subpixels of R, G and B are offset to each other, and are arranged in a rhombic shape. Here, the subpixels of the color liquid crystal panel also have QT structures in space with respect to the respective R, G and B components. However, the horizontal resolution is decreased.

FIGS. 7A through 7D show sampling points of the signals input to the liquid crystal panels with respect to time. In case of the color liquid crystal panel, sampling of the color signals is a polyphase type in which a sampling period of one color signal R, G and B is moved by ⅓ of a period to sample another component. Meanwhile, in the case of the white/black liquid crystal panel, sampling of the luminance signal is performed by three times the sampling frequency with respect to the color signal as shown in FIG. 7D.

Accordingly, the resolution of the image is three times greater than that of the color liquid crystal panel. Such a two-panel liquid crystal projector advantageously has a resolution as high as the three-panel system. That is, the one-panel system uses a single liquid crystal panel in which the R, G and B components are separately displayed, with a result that the resolution is lowered. The two-panel system has nearly the same resolution as that of the three-panel system. Among the three types of liquid crystal projector, the efficiency of light utilization is highest at 7.34% in the case of a luminance signal. Also, the two-panel liquid crystal projector is compact and relatively inexpensive.

A video signal processing circuit for use in such a two-panel liquid crystal projector is disclosed in Japanese laid-open patent publication No. 03201695 of Sep. 3, 1991, entitled "Projection Display Apparatus". The projection display apparatus includes a white/black liquid crystal display device for modulating a light transmission factor of a first linear polarized component based on a luminance signal separated by a YC separation circuit, and a color liquid crystal display for modulating a light transmission factor of a second linear polarized component based on the separated color signal. However, the apparatus in the prior art processes the luminance signal and the color signal so that they may be just overlapped on a screen. Thus, an unnatural image is displayed on a screen because the black level on the screen is higher than that of an original signal and the contrast is low.

SUMMARY OF THE INVENTION

Therefore, to solve the above problems, it is an object of the present invention to provide a video signal processing apparatus in a two-panel liquid crystal projector capable of removing an unnatural image by generating a luminance signal applied to a luminance signal liquid crystal panel and a color signal applied to a color signal liquid crystal panel based on one of a plurality of color difference signals.

To accomplish the above object of the present invention, there is provided a video signal processing apparatus for use in a two-panel liquid crystal projector comprising:

a luminance/chroma processor for receiving a luminance signal and a chroma signal and generating a first luminance signal and color difference signals; a matrix circuit for receiving the first luminance signal the chroma difference signals and generating a second luminance signal and color signals based on one of the color difference signals; and means for receiving and processing the second luminance signal and the color signals, so as to be used for a luminance signal liquid crystal panel and a color signal liquid crystal panel, respectively.

Preferably, the matrix circuit generates the second luminance signal and the color signals based on the minimum value of the color difference signals.

It is another object of the present invention to provide a video signal processing apparatus in a two-panel liquid crystal projector capable of removing an unnatural image phenomenon by generating a luminance signal applied to a luminance signal liquid crystal panel and a color signal applied to a color signal liquid crystal panel based on one of the color signals.

To accomplish the other object of the present invention, there is provided a video signal processing apparatus for use in a two-panel liquid crystal projector comprising:

a first color signal generator for receiving a first luminance signal and a chroma signal and generating a first red signal, a first green signal and a first blue signal; a luminance signal generator for receiving the first red, green and blue signals and generating a second luminance signal which is used for a luminance signal liquid crystal panel, based on one of three first color signals; and means for receiving the second luminance signal, and the first red, green and blue signals and generating second red, green and blue signals which are used in a color signal liquid crystal panel.

Preferably, the luminance signal generator generates the second luminance signal based on the minimum value of the three first color signals.

Further, the present invention uses an amplifier for reducing the difference between the light utilization efficiencies of the color signals and the luminance signal.

BRIEF DESCRIPTION OF THE DRAWINGS

The preferred embodiments are described with reference to the drawings wherein.

DETAILED DESCRIPTION OF THE PREFERRED EMBODIMENT

Preferred embodiments of the present invention will be described below in more detail with reference to the accompanying FIGS. 8 through 13.

Figure 8:
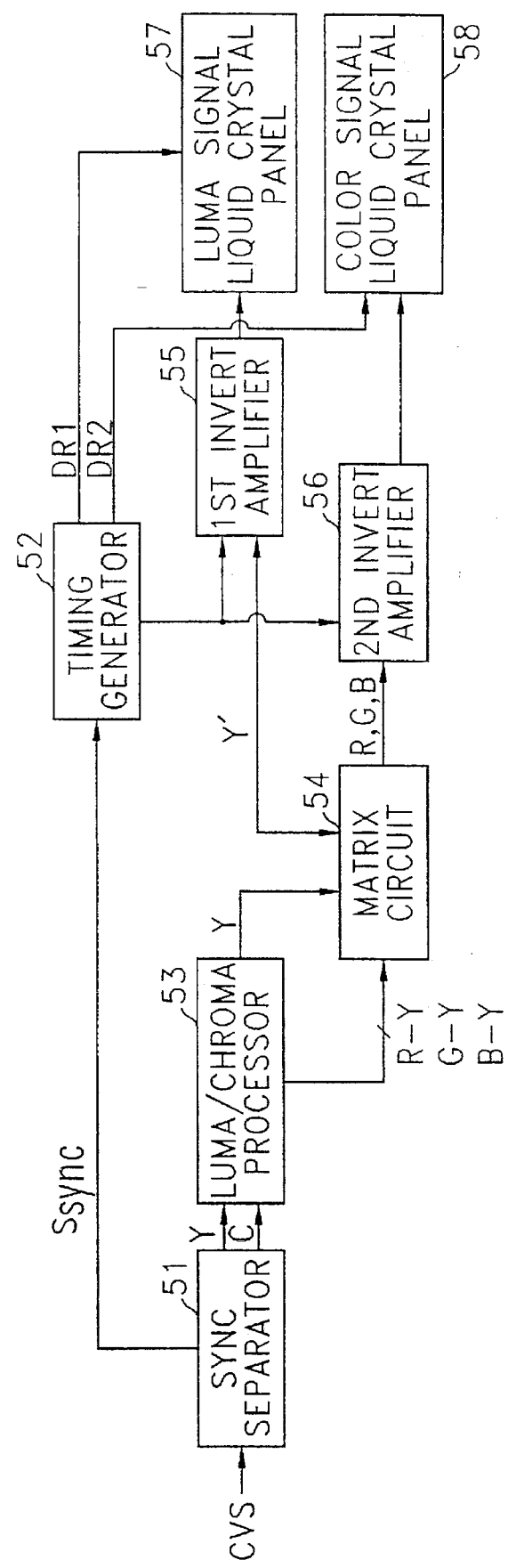
FIG. 8 is a block diagram of a signal processing system in a two-panel liquid crystal projector of the present invention.

In FIG. 8, when a composite video signal (CVS) is input to a sync separator 51, sync separator 51 separates a sync signal $S_{sync}$, a first luminance signal Y and a chroma signal C from the input signal, respectively. A timing generator 52 generates drive signals DR1 and DR2 and an invert signal synchronized to the sync signal $S_{sync}$ output from sync separator 51. The respective drive signals DR1 and DR2 are determined considering that the luminance signal has three times the sampling frequency as those of the respective color signals. Drive signal DR1 is applied to a white/black liquid crystal panel 57, while drive signal DR2 is applied to a color liquid crystal panel 58. On the other hand, a luminance/chroma processor 53 connected to the output of sync separator 51 receives first luminance signal Y and chroma signal C from sync separator 51 and generates color difference signals R-Y, G-Y and B-Y. When matrix circuit 54 has a constitutional structure shown in FIG. 9, matrix circuit 54 receives first luminance signal Y and color difference signals R-Y, G-Y and B-Y, and generates a second luminance signal Y' and color signals $R_1$, $G_1$ and $B_1$. On the other hand, when matrix circuit 54 has a constitutional structure shown in FIG. 11, matrix circuit 54 receives color signals R', G' and B' generated by an existing matrix circuit (not shown) and generates a third luminance signal $Y_2$' and color signals $R_2$, $G_2$ and $B_2$. The luminance signal Y' is applied to a first invert amplifier 55 while color signals R, G and B are applied to a second invert amplifier 56. First invert amplifier 55 inverts and amplifies luminance signal Y' according to an invert control signal applied from timing generator 52 and supplies the result to white/black liquid crystal panel 57. Second invert amplifier 56 inverts and amplifies color signals R, G and B according to the invert control signal and supplies the result to color liquid crystal panel 58. Respective X-axis and Y-axis driver integrate circuits (not shown) in liquid crystal panels 57 and 58 operate by corresponding drive signals DR1 and DR2, respectively. Thus, white/black liquid crystal panel 57 samples the luminance signal applied from first invert amplifier 55 according to drive signal DR1, while color liquid crystal panel 58 samples the color signals applied from second invert amplifier 56 according to drive signal DR2.

Figure 9:
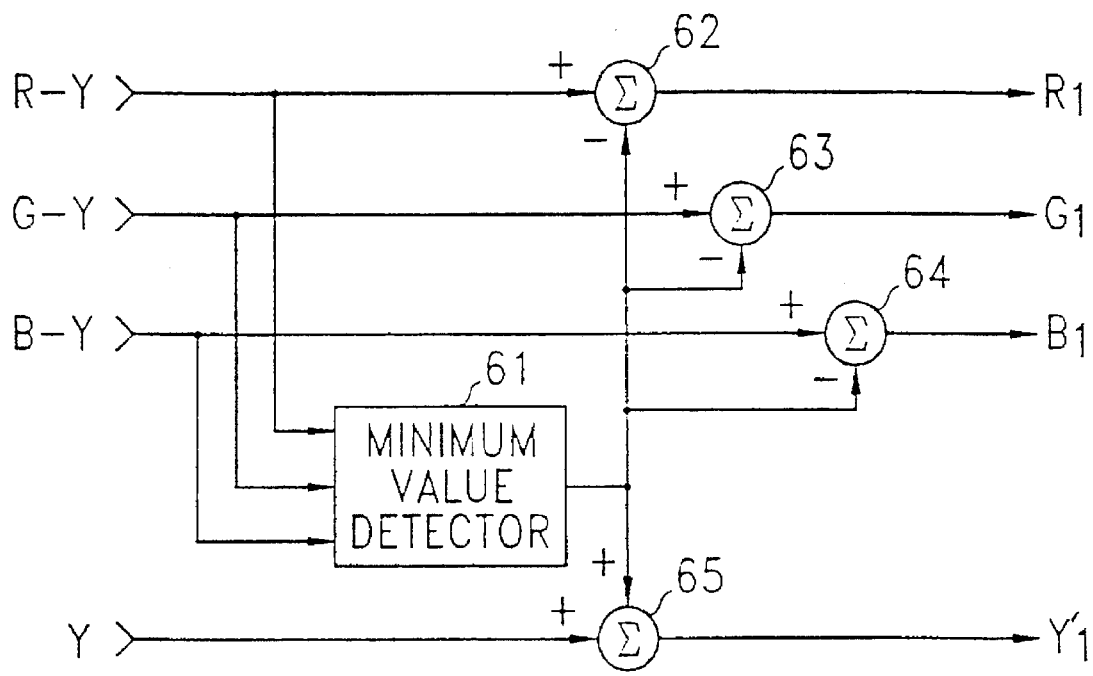
FIG. 9 is a detailed circuit diagram of the matrix circuit according to one embodiment of the present invention.

FIG. 9 is a detailed circuit diagram of the matrix circuit according to one embodiment of the present invention. The matrix circuit shown in FIG. 9 receives color difference signals R-Y, G-Y and B-Y and first luminance signal Y from luminance/chroma processor 53, and generates color signals $R_1$, $G_1$ and $B_1$ and second luminance signal $Y_1$'. Such a matrix circuit includes a minimum value detector 61, substraters 62, 63 and 64 and an adder 65.

When color difference signals R-Y, G-Y and B-Y and first luminance signal Y from luminance/chroma processor 53 are input to the FIG. 9 circuit, minimum value detector 61 detects the minimum value among the input color difference signals and supplies the minimum value to subtracters 62, 63 and 64 and adder 65. First subtracter 62 subtracts the minimum value from color difference signal R-Y and supplies the obtained red signal $R_1$ to second invert amplifier 56 of FIG. 8. Second subtracter 63 subtracts the minimum value from color difference signal G-Y and supplies the obtained green signal $G_1$ to second invert amplifier 56 of FIG. 8. Third subtracter 64 subtracts the minimum value from color difference signal B-Y and supplies the obtained blue signal $B_1$ to second invert amplifier 56 of FIG. 8. Here, adder 65 subtracts the minimum value from first luminance signal Y and supplies the obtained second luminance signal $Y_1$' to first invert amplifier 55 of FIG. 8. First invert amplifier 55 inverts and amplifies input second luminance signal $Y_1$' and supplies the result to white/black liquid crystal panel 57. Second invert amplifier 56 inverts and amplifies the input color signals $R_1$, $G_1$ and $B_1$ and supplies the result to color liquid crystal panel 58.

Figure 10:
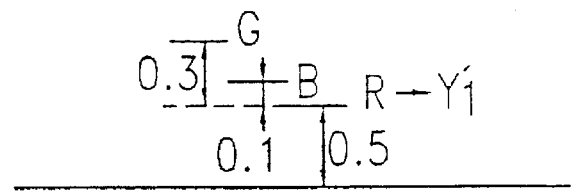
FIG. 10 is a view for explaining a change of a signal level by the matrix circuit of FIG. 9.

FIG. 10 is a view for explaining a change of a signal level by the matrix circuit of FIG. 9. For example, if the values of the respective color signals R, G and B prior to transmission are 0.5 for R, 0.8 for G and 0.6 for B, the value of luminance signal Y becomes 0.668 from a general relationship between luminance signal Y and color difference signals R-Y, G-Y and B-Y, that is, the equation Y=0.59 G+0.3 R+0.11 B. Thus, the value of R-Y becomes −0.188 (0.5−0.688), the value of G-Y becomes 0.112 (0.8−0.688), and the value of B-Y becomes −0.088 (0.6−0.688). Since the minimum value of the calculated color difference signals is −0.188, minimum value detector 61 outputs the minimum value of −0.188. Thus, first subtracter 62 outputs color signal $R_1$ having the value of 0. Second subtracter 63 outputs color signal $G_1$ having the value of 0.3. Third subtracter 63 outputs color signal $B_1$ having the value of 0.1. Adder 65 outputs second luminance signal $Y_1$' having the value of 0.5. Finally, the minimum value of 0.5 among the original color signals (R=0.5, G=0.8, and B=0.6) is supplied to first invert amplifier 55, while the difference values between the minimum value and the color signals are supplied to second invert amplifier 56.

The second embodiment of the present invention which produces signals to be supplied to invert amplifiers 55 and 56 using color signals will be described with reference to FIG. 11.

Figure 11:
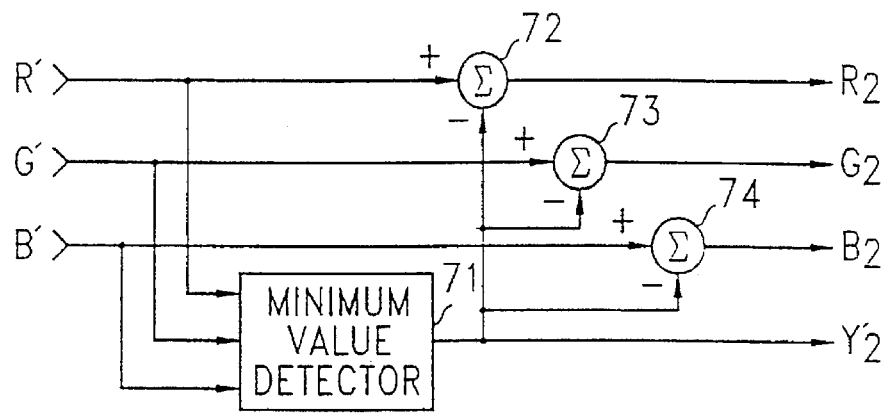
FIG. 11 is a detailed circuit diagram of the matrix circuit according to another embodiment of the present invention.

FIG. 11 is a detailed circuit diagram of part of the matrix circuit 54 according to a second embodiment of the present invention. The FIG. 9 circuit produces color signals $R_1$, $G_1$ and $B_1$ and second luminance signal $Y_1$' to be supplied to invert amplifiers 55 and 56 using color difference signals R-Y, G-Y and B-Y and first luminance signal Y, while the FIG. 11 circuit produces color signals $R_2$, $G_2$ and $B_2$ and third luminance signal $Y_2$' to be supplied to invert amplifiers 55 and 56 using color signals R', G' and B' which are produced by an existing matrix circuit (not shown). The conventional matrix circuit for generating color signals R', G' and B' produced by the existing method is not shown. However, according to the design selection, the conventional matrix circuit can be installed between luminance/chroma processor 53 and matrix circuit 54 of FIG. 8, or can be constituted so as to be included in matrix circuit 54. The color signals R', G' and B' produced by the conventional method are applied to minimum value detector 71 and subtracters 72, 73 and 74, respectively. The detected minimum value is used as third luminance signal $Y_2$' which is applied to first invert amplifier 55 and is also applied to subtracters 72, 73 and 74, respectively. Fourth subtracter 72 subtracts the minimum value from the input color signal R' to generate color signal $R_2$. Fifth subtracter 73 subtracts the minimum value from the input color signal G' to generate color signal $G_2$. Sixth subtracter 74 subtracts the minimum value from the input color signal B' to generate color signal $B_2$. The signals $R_2$, $G_2$ and $B_2$, produced in subtracters 72, 73 and 74, are applied to second invert amplifier 56.

The matrix circuits which are explained referring to FIGS. 9 and 11 use the minimum value of the color difference signals or the color signals to process the luminance signal which is used for displaying the luminance component of the image. Accordingly, the resolution and brightness of the image can be enhanced. For example, when the displayed image is a single red color, the image is displayed only through color liquid crystal panel 57, while when only the luminance component of the image exists, the image is displayed through only white/black liquid crystal panel 58 having higher resolution and brightness. Then, when an image has both a luminance component and a chroma component, most of the luminance component is displayed through white/black liquid crystal panel 57, and a pure chroma signal component is displayed through color liquid crystal panel 58. If the R-Y component is the minimum value, there is no R component which is displayed through color liquid crystal panel 58. However, since the minimum value is substantially related to the luminance signal component, the G and B components obtained by subtracting the minimum value therefrom are displayed by color liquid crystal panel 58. The luminance signal component which determines most of the resolution in the two-panel processing is displayed through white/black liquid crystal panel 57, thereby improving the overall resolution and brightness. Since the black level of the image is higher than the original signal due to the overlapping of the luminance signal and the color signals, the problem of reduced contrast can be solved. Thus, an unnatural image phenomenon can be removed so that an image close to the original image can be displayed.

Figure 1:
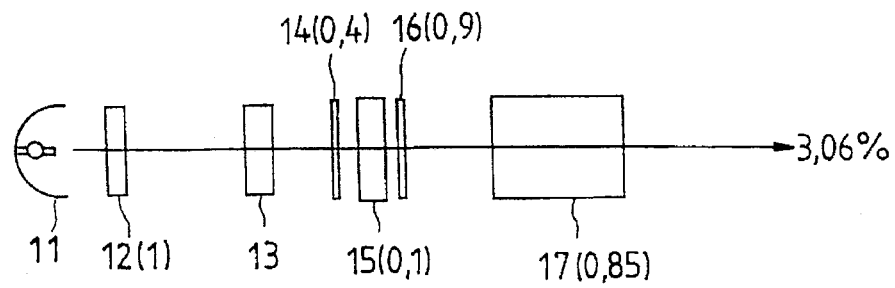
FIG. 1 is an optical arrangement diagram of a conventional one-panel liquid crystal projector.
Figure 2:
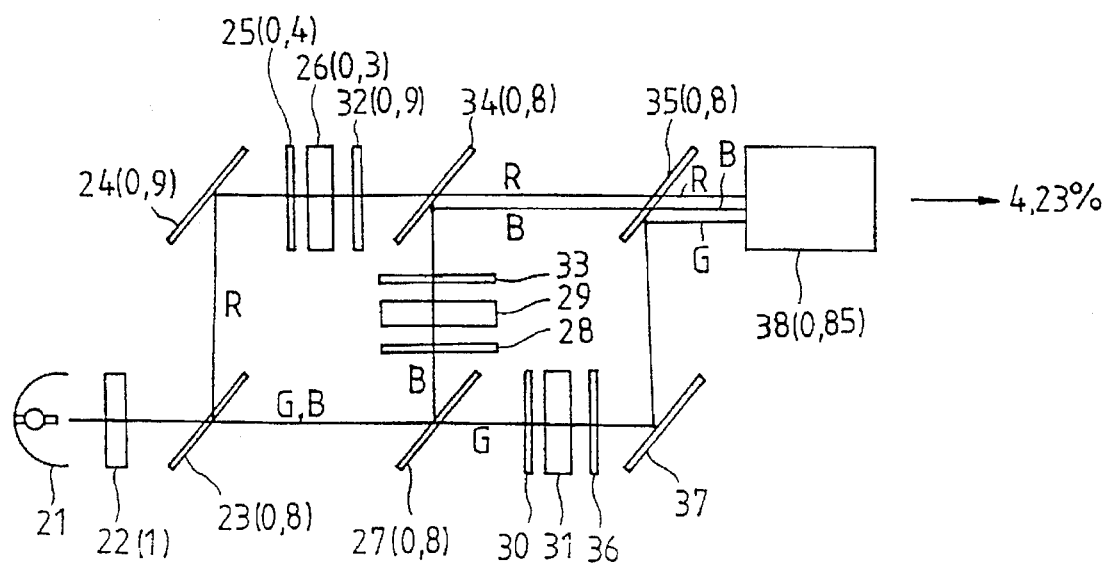
FIG. 2 is an optical arrangement diagram of a conventional three-panel liquid crystal projector.
Figure 3:
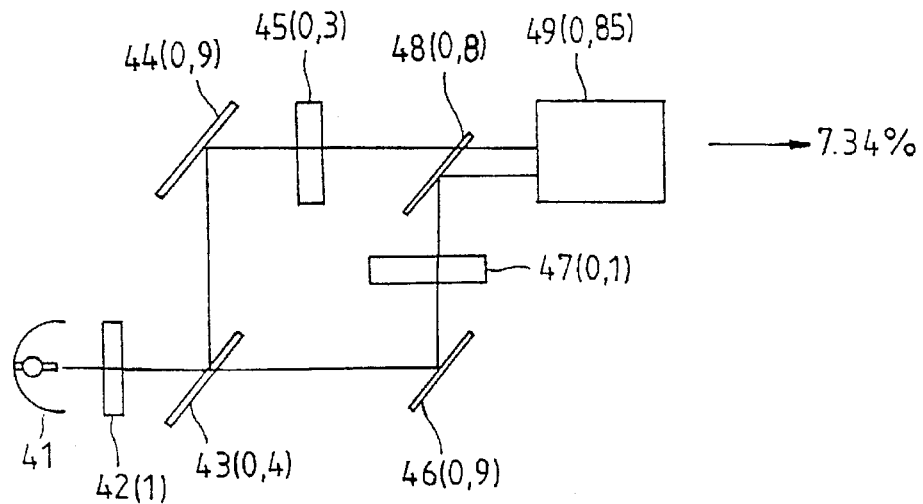
FIG. 3 is an optical arrangement diagram of a conventional two-panel liquid crystal projector.
Figure 4:
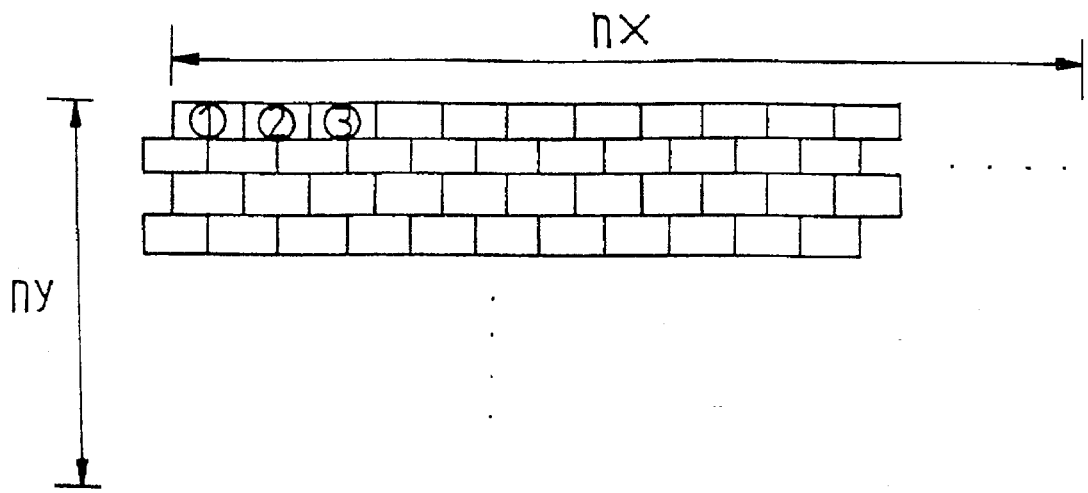
FIG. 4 shows a structure of a white/black liquid crystal panel used in the two-panel liquid crystal projector.
Figure 5:
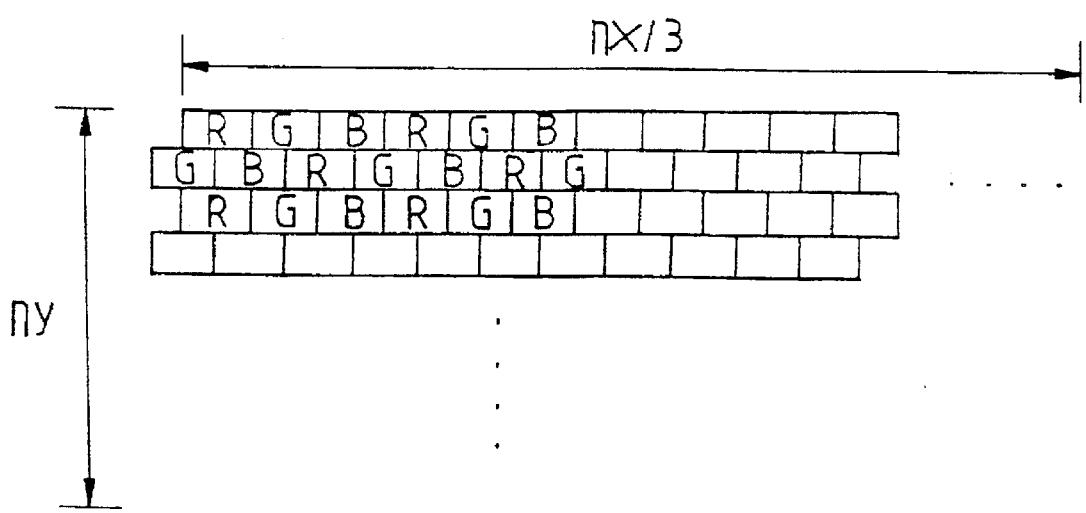
FIG. 5 shows a structure of a color liquid crystal panel used in the two-panel liquid crystal projector.
Figure 6:
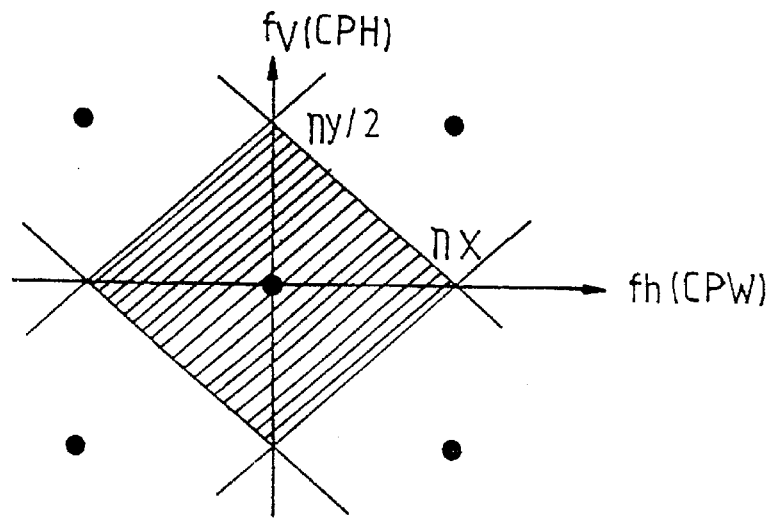
FIG. 6 shows a frequency spectrum of the white/black liquid crystal panel.
Figure 7A:
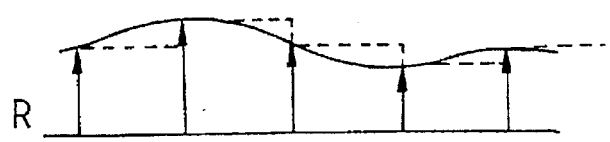
FIGS. 7A through 7D show sampling points of time with respect to the signals input to the liquid crystal panels.
Figure 7B:
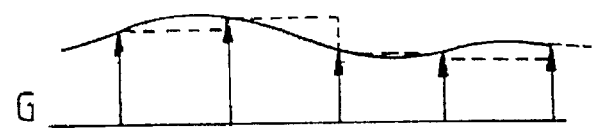
Figure 7C:
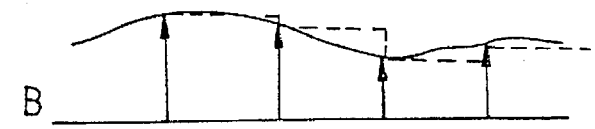
Figure 7D:
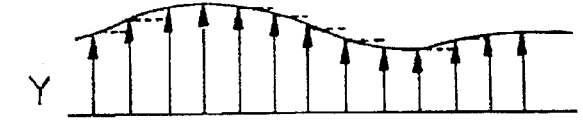

However, in the general two-panel liquid crystal projector there is a considerable difference between the light utilization efficiency of an optical luminance signal path used for light modulation of a luminance signal and that of an optical color signal path used for light modulation of color signals. Referring to FIG. 3 in which the light transmission factors corresponding to the respective components are represented, the light utilization efficiency of the optical luminance signal path is approximately 7.34% and that of the optical color signal path is approximately 2.45%. When the FIGS. 9 and 11 circuits are used in the two-panel liquid crystal projector, the luminance signal, the color difference signals or the color signals are produced by adder 65, or subtracters 62, 63 and 64 (or 72, 73 and 74) in view of the signal processing condition. The magnitudes of the newly obtained color signals become relatively smaller than the magnitude of the newly obtained luminance signal. To further improve the resolution and brightness of the image displayed by solving the above-described problems in relation to the optical condition and signal processing conditions, it is necessary to control an amplification factor with respect to the luminance signal applied to first invert amplifier 55 or the color signals which are applied to second invert amplifier 56. The circuits constituted by adding a function for controlling the amplification factor to the FIGS. 9 and 11 circuits are shown in FIGS. 12 and 13.

Figure 12:
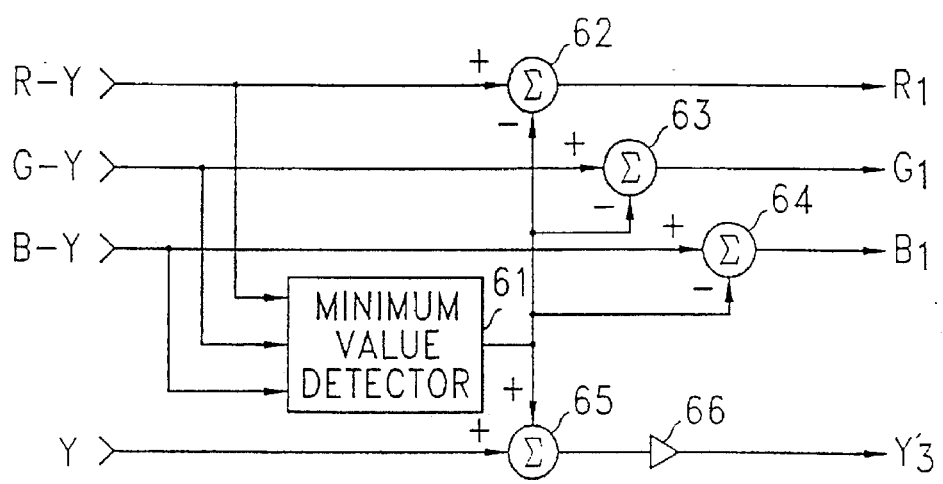
FIG. 12 shows a view of the FIG. 9 matrix circuit to which an amplifier is added.

FIG. 12 shows an amplifier 66 which is added to the output end of adder 65 in the FIG. 9 matrix circuit. FIG. 13 shows an amplifier 75 which is added to the output end of minimum value detector 71 in the FIG. 11 matrix circuit. The amplification factor of amplifier 66 or 75 which amplifies the input luminance signal and supplies the amplified result to first invert amplifier 55 is set considering the above-described signal processing and the optical conditions, and has a value for decreasing the amplitude of the luminance signal. Also, the amplification factor can be set so that the amplitude of the luminance signal is not abruptly decreased. Then, when the light utilization efficiencies of the optical luminance signal path and the optical color signal path are equal to each other and are used in consideration of only the optical conditions, the amplification factor can be set as one. If the amplification factor of amplifier 66 or 75 is set based on the above-described content or contents, the FIG. 12 amplifier 66 decreases the amplitude of third luminance signal $Y_2'$ applied from adder 65 according to a predetermined amplification factor to generate a fourth luminance signal $Y_3'$. The FIG. 13 amplifier 75 decreases the amplitude of the minimum value applied from minimum value detector 71 according to a predetermined factor to generate a fifth luminance signal $Y_4'$. The fourth luminance signal $Y_3'$ and the fifth luminance signal $Y_4'$ are applied to first invert amplifier 55, respectively.

Figure 13:
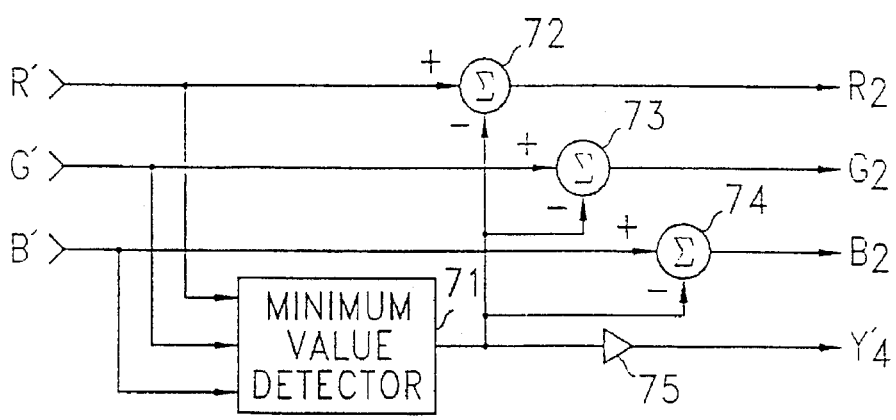
FIG. 13 shows a view of the FIG. 11 matrix circuit to which an amplifier is added.

If the FIGS. 12 and 13 circuits are adapted in the existing two-panel liquid crystal projector, the resolution and brightness can be improved. Also, the signal input to the luminance signal liquid crystal panel is attenuated in a proper ratio, to prevent dis-harmonization between the luminance signal component and the color signal components in consideration of the optical and signal processing conditions.

While only certain embodiments of the invention have been specifically described herein, it will be apparent that numerous modifications may be made thereto without departing from the spirit and scope of the invention.

What is claimed:

1. A video signal processing apparatus for use in a two-panel liquid crystal projector comprising:

a luminance/chroma processor for receiving a luminance signal and a chroma signal and for generating a first luminance signal and a plurality of color difference signals;

a matrix circuit for receiving the first luminance signal and the plurality of color difference signals and for generating a second luminance signal and a second plurality of color signals using a minimum one of the plurality of color difference signals as a reference signal, wherein each of said plurality of color signals is generated by subtracting the reference signal from a respective color difference signal; and means for receiving and processing the second luminance signal and the plurality of color signals, so as to be used by a luminance signal liquid crystal panel and a color signal liquid crystal panel, respectively.

2. A video signal processing apparatus for use in a two-panel liquid crystal projector, comprising:

a luminance/chroma processor for receiving a luminance signal and a chroma signal and for generating a first luminance signal and a plurality of color difference signals;

a matrix circuit for receiving the first luminance signal and the plurality of color difference signals and for generating a second luminance signal and a plurality of color signals using one of the plurality of color difference signals as a reference; and means for receiving and processing the second luminance signal and the plurality of color signals, so as to be used by a luminance signal liquid crystal panel and a color signal liquid crystal panel, respectively, wherein the plurality of color difference signals generated by said luminance/chroma processor includes a R-Y color difference signal, a G-Y color difference signal and a B-Y color difference signal, and wherein said matrix circuit comprises:

a minimum value detector for detecting a minimum value among values of the plurality of color difference signals output from said luminance/chroma processor;

a first subtracter for subtracting the minimum value from the R-Y color difference signal output from said luminance/chroma processor to generate a red color signal;

a second subtracter for subtracting the minimum value from the G-Y color difference signal output from said luminance/chroma processor to generate a green color signal;

a third subtracter for subtracting the minimum value from the B-Y color difference signal output from said luminance/chroma processor to generate a blue color signal; and an adder for subtracting the minimum value from the first luminance signal to generate the second luminance signal.

3. The video signal processing apparatus for use in a two-panel liquid crystal projector according to claim 2, further comprising an amplifier for amplifying the second luminance signal output from said adder.

4. The video signal processing apparatus for use in a two-panel liquid crystal projector according to claim 3, wherein said amplifier has a signal amplification factor based on a difference between a light utilization efficiency of the processed second luminance signal applied to a display screen and a light utilization efficiency of the plurality of color signals applied to a display screen.

5. A video signal processing apparatus for use in a two-panel liquid crystal projector comprising:

a first color signal generator for receiving a first luminance signal and a chroma signal and for generating a first red signal, a first green signal and a first blue signal;

a luminance signal generator for receiving the first red, green and blue signals and for generating a second luminance signal, which is supplied to a luminance signal liquid crystal panel based on one of the first red signal, the first green signal and the first blue signal; and means for receiving the second luminance signal, and the first red signal, the first green signal and the first blue signal and for generating second red, second green and second blue signals which are supplied to a color signal liquid crystal panel.

6. The video signal processing apparatus for use in a two-panel liquid crystal projector according to claim 5, wherein said means for receiving the second luminance signal, and the first red signal, the first green signal and the first blue signal and for generating said second red signal, second green signal and second blue signal comprises:

a first subtracter for subtracting the second luminance signal from the first red signal to generate a second red signal;

a second subtracter for subtracting the second luminance signal from the first green signal to generate a second green signal; and a third subtracter for subtracting the second luminance signal from the first blue signal to generate a second blue signal.

7. The video signal processing apparatus for use in a two-panel liquid crystal projector according to claim 6, further comprising an amplifier for amplifying the second luminance signal which is generated by said luminance signal generator.

8. The video signal processing apparatus for use in a two-panel liquid crystal projector according to claim 7, wherein said amplifier has a signal amplification factor based on a difference between a light utilization efficiency of the second luminance signals and a light utilization efficiency of the second red signal, the second green signal and the second blue signal which are displayed on a screen.

* * * * *